June 5, 1956

M. R. SACKETT 2,748,880

COMBINED MANUAL AND HYDRAULIC POWER
STEERING MECHANISM FOR VEHICLES

Filed June 15, 1953

INVENTOR.
Manley R. Sackett
BY
*Glenn L. Fish*
ATTORNEY

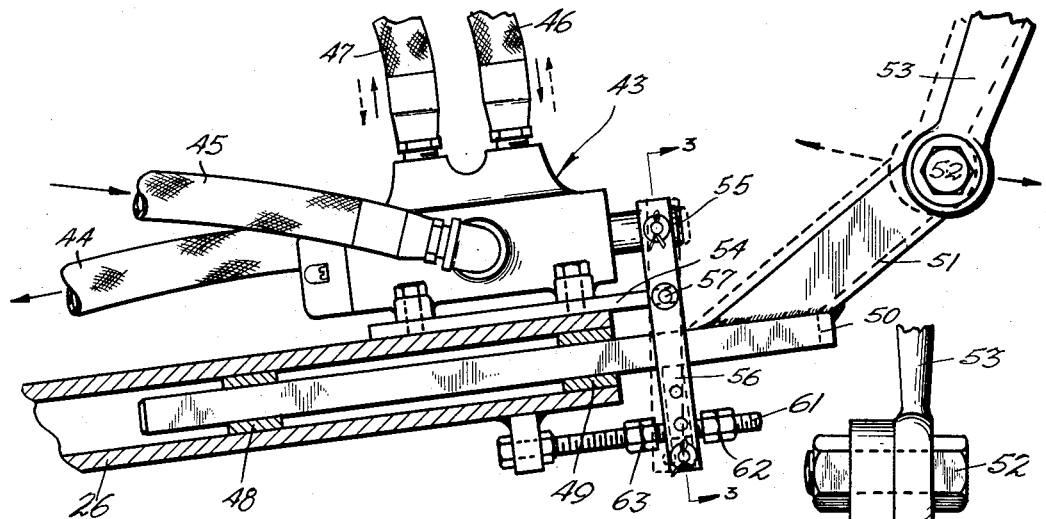
FIG-2
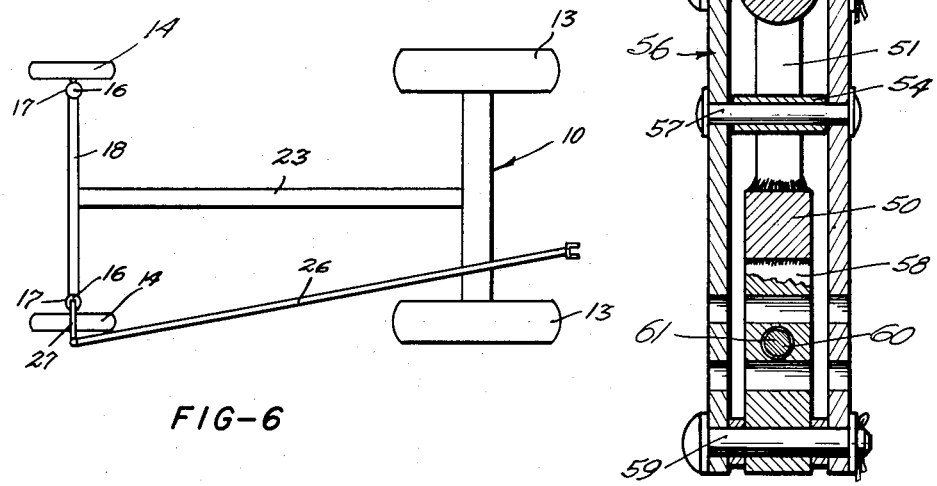
FIG-6
FIG-3
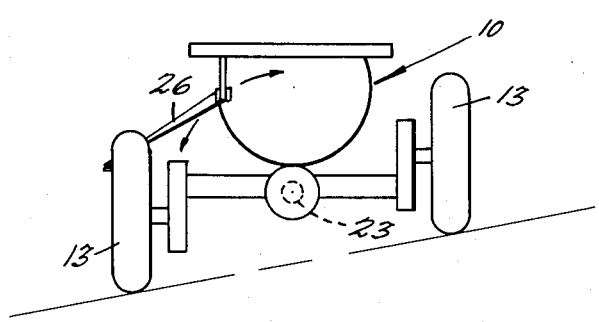
FIG-7
INVENTOR.
Manley R. Sackett
BY
*Glenn L. Fish*
ATTORNEY June 5, 1956            M. R. SACKETT            2,748,880
COMBINED MANUAL AND HYDRAULIC POWER
STEERING MECHANISM FOR VEHICLES Filed June 15, 1953                         3 Sheets-Sheet 3

INVENTOR.
Manley R. Sackett
BY
ATTORNEY

United States Patent Office 2,748,880
Patented June 5, 1956

2,748,880

COMBINED MANUAL AND HYDRAULIC POWER STEERING MECHANISM FOR VEHICLES

Manley R. Sackett, Spokane, Wash.

Application June 15, 1953, Serial No. 361,588

1 Claim. (Cl. 180—79.2)

This invention relates in general to the steering mechanism of vehicles and more particularly to a combined power and manually operated mechanism for actuating the steering devices of vehicles.

One object of the invention lies in the provision of a fluid powered mechanism adapted to assist in the manual steering of a vehicle and constructed and arranged so as to permit manual assistance to the power mechanism when desired, and to effect powered steering operation at all other times.

A further object of the invention lies in the provision of a fluid powered mechanism adapted to effect steering movements of the steering mechanism and controlled by manual movements of the steering wheel; said fluid powered mechanism being actuated when the normal position of the steering wheel, relative to the steering mechanism, is varied.

Another object of the invention lies in the provision of a fluid powered mechanism for effecting steering movements of the steering mechanism of a vehicle which includes a valve fixed relative to the steering mechanism and having a valve actuator fixed relative to the manually operated steering wheel whereby movements of either the steering wheel or the steering mechanism relative to the other actuates the power mechanism to move the steering mechanism to its normal position relative to the steering wheel.

Yet another object of my invention is to provide a simple and inexpensive force transmitting means interconnecting a steering arm and a relatively fixed support to effect steering movement of the arm; said means being controlled by a valve mechanism operable to energize the force transmitting means to maintain the steering mechanism in constant position relative to the steering wheel.

These and other objects of the invention will become apparent to those skilled in the art to which it appertains during the course of the following description.

In the accompanying drawings, forming a part of this specification, and in which like numerals are employed to designate like parts:

Figure 2 is an enlarged fragmentary view in elevation of the control valve and associated parts and having parts in cross section for convenience of illustration;

Figure 3 is a transverse vertical cross section as at line 3—3 of Figure 2;

Figure 6 is a diagrammatic view in plan of the steering mechanism and drag link as they are associated with the harvesting machine; and Figure 7 is a diagrammatic view in front elevation showing the steering mechanism and drag link relative to the harvesting machine.

It will be seen that I have shown the invention as particularly relating to a self propelled harvester, and while it is admirably suited for steering this type of vehicle, it is not my desire nor intention to limit the scope of the invention to any specific vehicle, but rather, I desire to secure the invention as broadly as possible in view of the prior art, and as defined in the appended claims.

Figure 1:
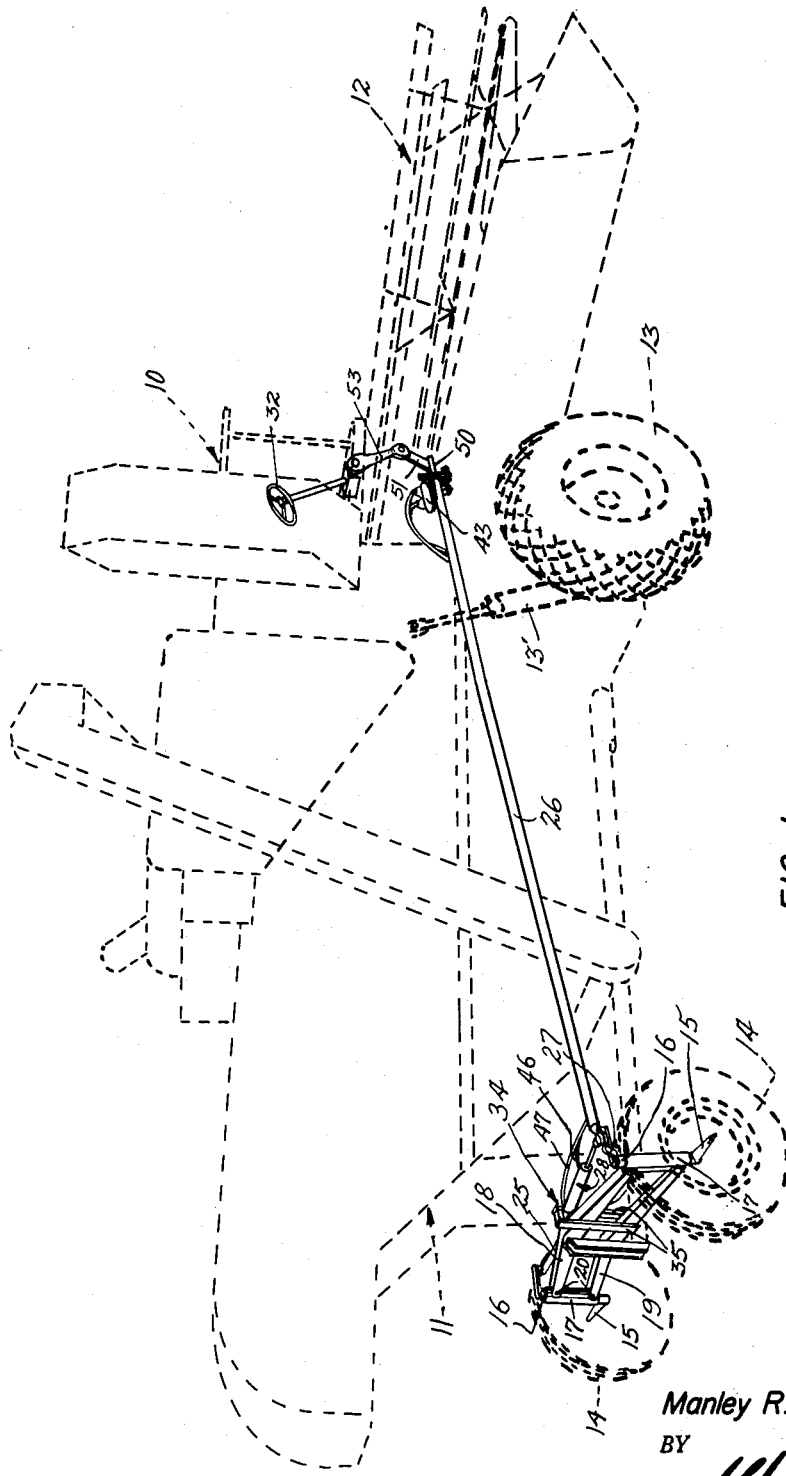
Figure 1 is a perspective view of the steering mechanism of a self propelled harvester and showing its position relative to the harvester indicated by dotted lines.

Referring now more particularly to the drawings, in Figure 1 I have shown in dotted lines a self propelled harvester 10 having the usual separator 11 and header 12. The harvester is propelled by means of powered drive wheels 13 and hydraulic servomotors 13' are operably associated with the drive wheels and machine body to enable one to maintain the harvester's separator in a transversely horizontal position on all tillable grades.

Figure 5:
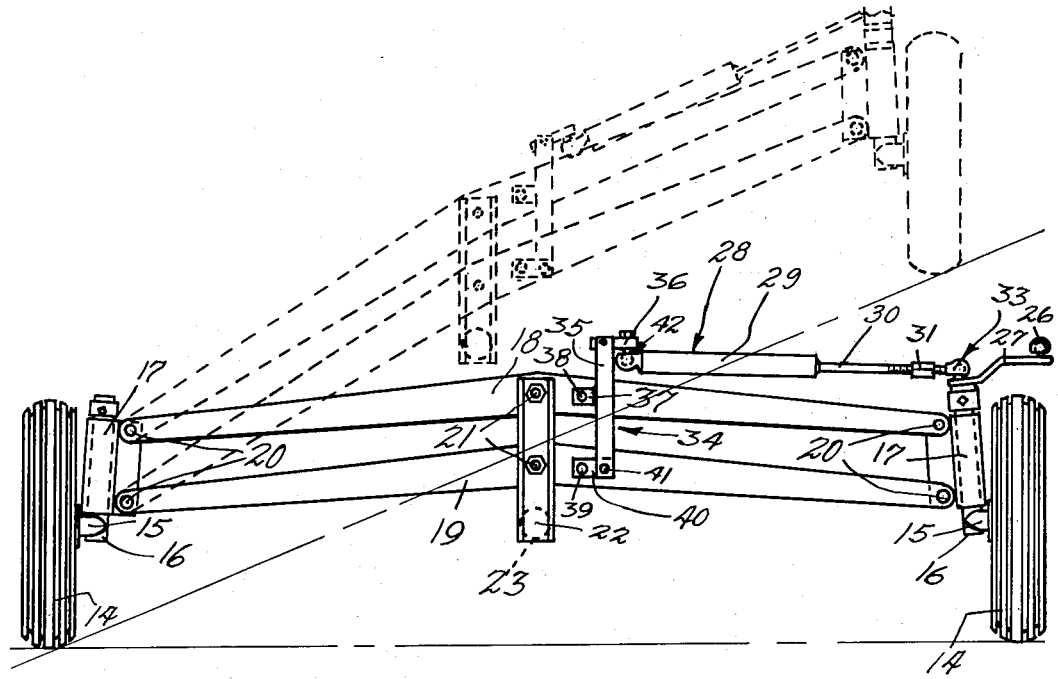
Figure 5 is a rear elevation of the steering mechanism mounting showing, in dotted position, the wheels disposed at an angle as traversing a grade.

As illustrated more particularly in Figure 5, it will be seen that the steering wheels 14 are journaled on spindles 15 extending horizontally from king pins 16 disposed substantially vertically and rotatably carried in bearing housings 17. The bearing housings 17 are pivotally united to spaced upper and lower transversely extending axle bars 18 and 19 by means of pivot pins 20 extending transversely of the axle bars 18 and 19 and disposed at each end on vertically spaced parallel axes.

Each axle bar is pivotally carried by a pivot pin 21 disposed midway the length thereof and parallel with the pivots 20. A vertical tie beam 22 unites the pivots 21 and extends below the axle bar 19 where it is secured to support beam 23 for the harvester. The harvester tilts vertically about the axis of the support beam 23 during its leveling operations by means of alternately raising and lowering the powered wheels 13 and the axle bars tilt to angles conforming with the transverse grade of the ground over which the harvester is moving, while the steering wheel support mechanism maintains the wheels 14 in vertical planes.

Figure 4:
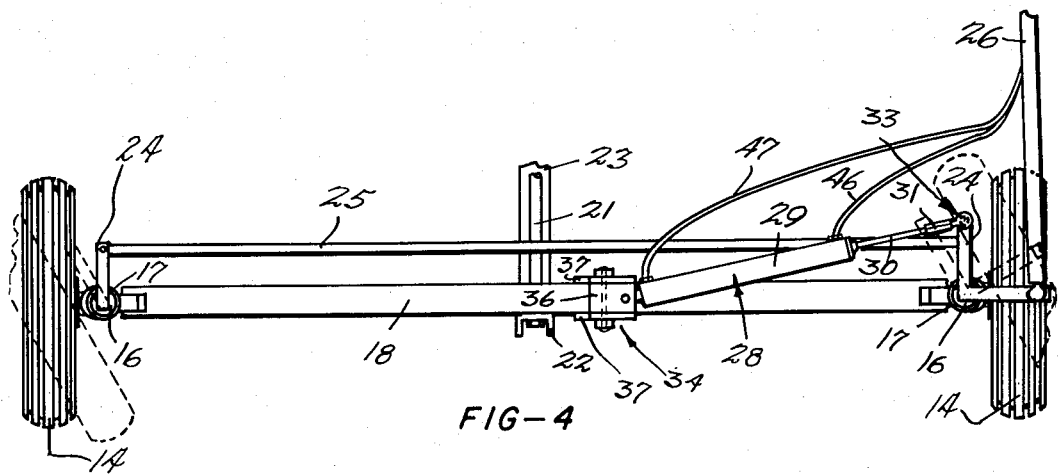
Figure 4 is a plan view of the steering mechanism mounting.

To effect steering of the wheels 14, each king pin 16 is provided with a steering arm 24 which extends from the top of the king pin at right angles to the king pin and is united with the other steering arm 24 by means of a tie rod 25. Because the steering arm 24 on the right hand wheel, when viewed as in Figures 4 and 5, extends substantially axially of the machine and parallel with the drag link 26 when the wheels are in the straight forward position, there is a second steering lever 27 secured to the upper end of one king pin 16 and extends substantially horizontally from the king pin and laterally from the companion steering arm 24. It may thus be seen that as the drag link 26 is shifted axially, the steering lever 27 is moved causing king pin 16 to pivot within the housing 17 and through the linkage of steering arms 24 and tie rod 25, both wheels are pivoted simultaneously. The construction thus far described is conventional and is not claimed as my invention.

In adapting the steering mechanism for power steering, I have provided a fluid pressure motor 28 which is of the well known expansion type and comprises a cylinder 29 which has the usual reciprocating piston and a piston rod 30. The piston rod is provided with a turnbuckle 31 which permits longitudinal adjustment of the rod to properly align the wheels with the manually operated steering wheel 32. At the outer end, I provide the piston rod 30 with a ball and socket joint 33 which has the ball element of the joint secured to the steering arm 24 and the socket element on the piston rod.

The opposed end of the motor 28 is supported on a securing frame 34 which permits erratic pivotal movements of the motor, and the purpose of the frame is to provide means of securing the inner end of the motor at a point spaced from the axle bars commensurate with the distance said ball and socket joint 33 is spaced therefrom so that during vertical tilting movement of the axle bars the distance between the frame 34 and the ball and socket joint 33 will not vary and cause the wheels 14 to swivel about king pins 16.

In detail, the frame 34 comprises a pair of vertically extending parallel bars 35 disposed one on each side of the axle bars 18 and 19 and having a normally horizontal plate 36 mounted for pivotal movement about an axis parallel with the pivots 20 and 21 and supported in the upper ends of bars 35. Each bar is provided with an ear 37 extending at right angles from its respective bar at a point commensurate with the horizontal median line of the upper axle bar 18, and the ears are pivotally secured to the axle bar 18 at 38. The distance measuring from the pivot point 38 to the transverse center of the bars 35 is equal to the distance from the pivots 20 to the transverse center of the king pins 16 thus during tilting movement of the axle bars 18 and 19, the bars 35 maintain an unchanging relation to the king pin 16.

The lower ends of bars 35 are pivotally secured at 39 to lower axle bar 19 by means of links 40 pivotally secured to bars 35 at 41. Even though theoretically there is no variation between the length of the bar 35 between the pivot 41 and the point where ear 37 is secured, in actual practice I find it is necessary to provide this movable link to facilitate proper functioning of the device. This may be caused by inaccuracies in construction but at present the actual reason is unknown to me.

The plate 36 carries one element of a ball and socket joint 42 while its companion element is carried by the cylinder 29 of motor 28. It will thus be seen that the motor is mounted to tilt with the axle bars 18 and 19 and to maintain its relative position to the wheels when steering is not desired.

To effect steering of the wheels, I utilize the fluid pressure system which is common to this type of vehicle, but obviously an auxiliary system may be employed if found desirable. A distributing valve 43 is interposed the fluid system shown as conduits 44 and 45 and also is interposed a pair of conduits 46 and 47 which lead to the inner and outer ends of the motor cylinder 29.

As best seen in Figure 2, at least the forward end portion of drag link 26 is hollow or tubular and is provided with spaced bearings 48 and 49 which telescopically receive and journal a reciprocable shaft 50. The shaft is provided with a forwardly extending ear 51 which is pivotally secured by pivot pin 52 to the free end of drop arm 53 forming a part of the manually operated steering means, and which is common to most conventional steering mechanisms. Rotation of the steering wheel 32 causes the drop arm 53 to swing and thus to shift shaft 50 longitudinally of the drag link 26. Normally the drag link is powered by the drop arm 53 to effect operation of the steering mechanism, but in the present invention a relative axial movement between the drag link 26 and the shaft 50 is utilized to operate the control valve 43.

Valve 43 is rigidly secured to the drag link 26 by means of a mounting plate 54 and has a valve actuating stem 55 extending therefrom and adapted to operate the valve which is of the distributing type and capable, when in the center neutral position, of directing the full flow through conduit 44 and also directing the fluid into conduits 47 or 46 in varying proportions commensurate with the amount and direction of axial movement of the stem 55 parallel with the axis of movement of shaft 50, while the opposed conduit 46 or 47 is exhausting into the return line 44.

A lever 56 is fulcrumed intermediate its length at 57 to the plate 54 and is pivotally united with the stem 55 at one end while the other end is pivotally united by means of a removable pin 59 with depending finger 58 fixed on the shaft 50 opposed to the fulcrum 57. The pin may be applied through any one of a number of aligned apertures in the lever 56 and the finger 58. As shown in Figure 3 the lever 56 comprises a pair of spaced bars, however, this is mere design and not an important feature of the invention. Obviously the selective positioning of the pin 59 toward the fulcrum 57 will result in greater axial movement of the stem 55 and removal from the fulcrum will diminish the axial movement of the stem relative to the axial reciprocative movement of shaft 50.

Figures 2 and 3 show that an aperture 60 is formed in the finger 58 and is disposed to receive a threaded rod 61 which is in spaced parallel relation to the shaft 50 and is fixed to drag link 26. Stops 62 and 63 are adjustably located along the length of the rod 61 and are disposed on the forward and rearward ends of the rod on either side of the finger 58.

It may thus easily be seen that as the manually operated steering wheel 32 is rotated the drop arm 53 is swiveled and the shaft 50 is moved longitudinally of the drag link 26 and this movement between the parts effects a predetermined degree of movement of the stem 55 of valve 43 and energizes motor 28 which turns the steering mechanism to shift drag link 26 again to its normal intermediate position relative to the shaft 50.

In the event that one wheel 14 should strike an obstacle, such as a rock or ditch and cause the wheels 14 to pivot about the king pins 16, the relative position of the drag link 26 and the shaft 50 will be changed and the valve will be operated to return the wheels to the position where the finger 58 of the shaft 50 is midway the stops 62 and 63 fixed with relation to the drag link.

Inspection of Figures 6 and 7 will show that the forward end of the drag link 26 is in nearer spaced relation to the axis of transverse tilt of the machine than the rear end. Because of this, the leveling actions of the machine tend to steer the steering mechanism by pushing or pulling on the drag link. For example, when the machine is tilted to the right (as viewed in Figure 7) and then moved to the upright position, rearward pressure is applied to the drag link by this movement thus imparting steering movement to the wheels 14. In actual practice, when a maximum turn is being made to the left during the righting tilt of the machine, the steering lever has been sheared from the king pin. With the present invention, however, this is avoided because the rearward pressure is applied to the shaft 50 and the subsequent change of relative position actuates the valve and corrects the wheel position to that of the manually operated steering wheel 32 no matter what movement is produced by the leveling operation.

For the sake of safety, I use a valve having a by-pass to eliminate the possibility of overloading the motor 28, and if it is found necessary to assist the motor, the stops 62 or 63 contact the finger 58 thus mechanically engaging the shaft 50 with the drag link 26 and permitting manual pressure to assist in the steering movement.

Having thus described my invention, I claim:

The combination with steering mechanism having upper and lower spaced parallel axle bars pivotally mounted midway their lengths on vertically spaced parallel axes for coplanar vertical tilting movement; bearing housings pivotally carried by the free ends of said bars on vertically spaced axes parallel with said first named axes; substantially axially vertical king pins journaled in said bearing housings and having spindles extending horizontally therefrom to receive and rotatably carry steering wheels; and steering arms extending laterally from each king pin and united by a tie bar whereby the king pins are connected for commensurate axial rotation; of the improvement comprising a fluid pressure motor having means at one end pivotally connecting said motor to said axle bars, and the oposed end of said motor being pivotally united to one said steering arm at a point removed from its king pin; said means comprising vertically extending bars disposed one at each side of said axle bars; said vertical bars being pivotally united with said axle bars on axes parallel with said first named axles and offset from the median line of said axle bars a distance commensurate with the horizontal offset from the axis of one said king pin to the axes of its companion bearing housing pivots; universal connecting means uniting the motor and the vertical bars adjacent to their upper end portions at a point spaced from the axes of the vertical bars a distance substantially the same as the distance from the axes of said bearing housing pivots to the opposed motor connecting means.

References Cited in the file of this patent

UNITED STATES PATENTS

| | | |
|---|---|---|
| 1,826,113 | Winsor | Oct. 6, 1931 |
| 2,022,698 | Vickers | Dec. 3, 1935 |
| 2,487,618 | Twyman | Nov. 8, 1949 |
| 2,562,881 | Baldwin et al. | Aug. 7, 1951 |
| 2,565,929 | Onde | Aug. 28, 1951 |
| 2,608,263 | Garrison | Aug. 26, 1952 |
| 2,625,232 | Lado | Jan. 13, 1953 |

FOREIGN PATENTS

| | | |
|---|---|---|
| 629,649 | France | Nov. 14, 1927 |
| 654,269 | Great Britain | June 13, 1951 |